United States Patent [19]

Iacovangelo et al.

[11] Patent Number: 4,540,640
[45] Date of Patent: Sep. 10, 1985

[54] COATED POWDER FOR ELECTROLYTE MATRIX FOR CARBONATE FUEL CELL

[75] Inventors: Charles D. Iacovangelo; Kenneth W. Browall, both of Schenectady, N.Y.

[73] Assignee: The United States of America as represented by the United States Department of Energy, Washington, D.C.

[21] Appl. No.: 489,431

[22] Filed: Apr. 29, 1983

[51] Int. Cl.³ .............................................. H01M 8/00
[52] U.S. Cl. ........................................ 429/41; 429/46; 429/16; 428/404; 428/403; 428/325
[58] Field of Search ................. 428/325, 404, 403; 427/115; 429/46, 16; 523/210, 200; 501/153, 136

[56] References Cited

U.S. PATENT DOCUMENTS

| | | | |
|---|---|---|---|
| 3,132,956 | 5/1964 | Lewis | 428/404 X |
| 3,362,846 | 1/1968 | Lee et al. | 428/404 X |
| 3,466,197 | 9/1969 | Bawa | 429/46 |
| 3,628,989 | 12/1971 | Solmi | 428/325 |
| 4,079,171 | 3/1978 | Marianowshi et al. | 429/46 |
| 4,115,632 | 9/1978 | Kinoshita et al. | 427/115 X |
| 4,175,055 | 11/1979 | Goller et al. | 427/115 X |
| 4,216,278 | 8/1980 | Arendt et al. | 429/46 X |
| 4,235,948 | 11/1980 | Holmes | 428/325 X |
| 4,279,971 | 7/1981 | Arendt | 429/16 |
| 4,353,958 | 10/1982 | Kita et al. | 428/403 X |
| 4,410,585 | 10/1983 | McLoughlin | 428/325 X |
| 4,411,968 | 10/1983 | Reiser et al. | 429/41 |

Primary Examiner—George F. Lesmes
Assistant Examiner—Nancy A. B. Swisher
Attorney, Agent, or Firm—Hugh W. Glenn; Robert J. Fisher; Judson R. Hightower

[57] ABSTRACT

A plurality of electrolyte carbonate-coated ceramic particle which does not differ significantly in size from that of the ceramic particle and wherein no significant portion of the ceramic particle is exposed is fabricated into a porous tape comprised of said coated-ceramic particles bonded together by the coating for use in a molten carbonate fuel cell.

6 Claims, 1 Drawing Figure

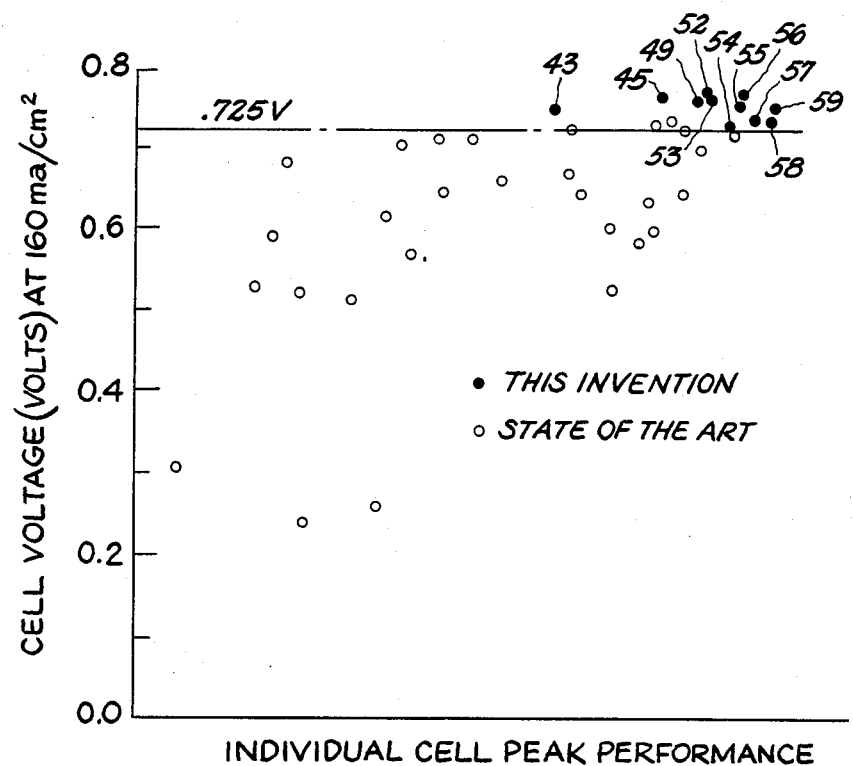

COATED POWDER FOR ELECTROLYTE MATRIX FOR CARBONATE FUEL CELL

The present invention is directed to a coated powder for preparing an electrolyte porous matrix, i.e. electrolyte porous tape, for a carbonate fuel cell.

The anode and cathode of state-of-the-art carbonate fuel cells are separated by an electrolyte layer, commonly called a "tile". The tile is typically composed of $LiAlO_2$ or $SrTiO_3$ particles which comprise a porous ceramic matrix, the interstices of which are filled with a carbonate electrolyte mixture.

One of the principal problems associated with the tile is fabrication by a commercially attractive method, consistent with desirable characteristics, i.e., porosity, pore size distribution, and strength.

Recent work in this area has been directed towards casting of the matrix ceramic powder by vacuum casting, tape casting, and electrophoretic deposition. Although all three methods are commercially viable processes, all three methods produce undesirable products. The pivotal problem of the structures produced by these processes is that they fracture when the electrolyte is introduced (referred to in the art as impregnating).

In accordance with the present invention, a porous electrolyte matrix, i.e. tape, is formed which overcomes this problem of cracking upon electrolyte carbonate impregnation in the fuel cell. In this invention, the ceramic particles are first coated with a layer of carbonate.

Briefly stated, the present invention is directed to the production of electrolyte carbonate-coated ceramic particles which are fabricated into a porous electrolyte tape for use as the porous matrix of the tile in a molten carbonate fuel cell.

In the accompanying FIGURE, peak cell voltage is plotted for a number of individual operating molten carbonate fuel cells, each point in the FIGURE indicates a molten carbonate fuel cell. The numbered points in the FIGURE illustrate the present invention.

One embodiment of the present invention comprises a process for producing coated ceramic particles for fabrication into a porous electrolyte tape for a molten carbonate fuel cell which comprises forming a mixture of electrolyte carbonate and ceramic particles wherein the carbonate ranges from about 5% by volume to about 30% by volume of the total amount of said mixture, said ceramic particle ranging in size from about 0.1 micron to about 5 microns, said ceramic particles not being significantly deleteriously effected by said molten carbonate fuel cell, heating said mixture to a temperature at which the carbonate is molten but at which it does not vaporize significantly, coating said ceramic particle with said molten carbonate leaving no significant portion of said ceramic particle exposed, and allowing the resulting carbonate-coated particles to cool to solidify the carbonate.

Another embodiment of the present invention comprises coated particles for fabrication into a porous electrolyte tape composed of said coated particles bonded together by said coating, said coated particles being comprised of a plurality of electrolyte carbonate-coated ceramic particle which does not differ significantly in size from said ceramic particle and wherein no significant portion of said ceramic particle is exposed, said electrolyte carbonate ranging from about 5% by volume to about 30% by volume of the total amount of said coated particles, said ceramic particles not being significantly deleteriously effected by said molten carbonate fuel cell, said ceramic particle ranging in size from about 0.1 micron to about 5 microns.

In carrying out the present process, the particular electrolyte carbonate or carbonate mixture used depends largely on the fuel cell being constructed. Generally, it is selected from the group consisting of lithium carbonate, sodium carbonate, potassium carbonate, mixtures thereof, and mixtures thereof with strontium carbonate. The present electrolyte carbonate is a solid at room temperature and its melting point depends on its particular carbonate composition. All of the present electrolyte carbonates are molten at the operating temperature of the fuel cell which usually ranges from about 500° C. to about 700° C. In most instances, and preferably, the present carbonate is a mixture of about 62 mole % lithium carbonate and about 38 mole % potassium carbonate, which has a melting point of about 500° C.

The present ceramic particles are not significantly deleteriously effected by the molten carbonate fuel cell, i.e. by the operating environment of the molten carbonate fuel cell. Specifically, the present ceramic particles are stable to the operating environment of the molten carbonate fuel cell. Representative of the present ceramic particles are those selected from the group consisting of lithium aluminate, strontium titanate and mixtures thereof.

The size or size distribution of the ceramic particles depends largely on the porosity desired in the porous electrolyte tape fabricated therefrom. Generally, the ceramic particles range in size from about 0.1 micron to about 5 microns, and preferably from about 0.2 microns to about 2 microns. Preferably, ceramic particles of distributed size are used, such as for example, 25% by volume of ceramic particles of a size of about 0.2 micron and 75% by volume of particles of a size of about 1–2 microns to produce a porous tape of distributed pore size.

The ceramic particles are coated with the electrolyte carbonate to produce carbonate coated-particles wherein the ceramic particle is totally coated by carbonate, or wherein no significant portion of the ceramic particle is exposed. The size of the carbonate-coated ceramic particle is essentially the same as that of the ceramic particle, i.e., it does not differ significantly in size from that of the ceramic particle.

The coated ceramic particles are produced by coating the ceramic particles with the electrolyte carbonate in molten form and allowing the resulting material to cool and solidify. Preferably, a particulate mixture of the electrolyte carbonate and ceramic particles is formed, and although the size of the carbonate particles is not critical, it is preferably less than about 50μ. The mixture is heated at ambient pressure in air to a temperature at which the carbonate is molten, but at which it does not vaporize significantly. Preferably, the mixture is heated to a temperature ranging from about 500° C. to about 650° C. There is no significant advantage in using temperatures higher than about 650° C. The mixture is maintained at the temperature at which the carbonate is molten for a time period sufficient for the molten or fluid carbonate to coat the particles completely or to leave no significant portion thereof exposed. The resulting mass, i.e. carbonate-coated particles, is allowed to cool, preferably to room temperature, to solidify the carbonate, and then it is lightly comminuted producing free flowing coated particles wherein no significant portion of the ceramic particle is exposed.

The present coated ceramic particles can be fabricated into a porous electrolyte tape for use in a carbonate fuel cell by a number of techniques. Specifically, the present porous electrolyte tape is comprised of a plurality of electrolyte carbonate-coated ceramic particle bonded together by the electrolyte carbonate coating and having no significant portion of the ceramic particle exposed, said ceramic particles not being significantly deleteriously effected by said molten carbonate fuel cell and ranging in size (e.g. diameter or linear dimension) from about $0.1\mu$ to about $5\mu$, said carbonate ranging from about 5% by volume to about 30% by volume of the total volume of said coated ceramic particles, and said coated ceramic particle not differing significantly in size from said ceramic particle (e.g. a 30% volume increase generally will correspond to less than a 10% diameter increase).

The present electrolyte tape has a thickness and porosity which depend largely on the requirements of the molten carbonate fuel cell. Specifically, the present porous electrolyte tape has a uniform or substantially uniform thickness of less than about 30 mils (760 microns), i.e., it has a thickness which does not differ significantly. Generally, its thickness ranges from about 7 mils (180 microns) to about 20 mils (500 microns). Generally, it is self-supporting. It has a porosity ranging from about 30% by volume to about 65% by volume, and preferably about 50% by volume, of the total volume of the tape. Generally, it has a pore size ranging from about 0.2 micron to about 2 microns, and a median pore size of about 1 micron. It is useful as an electrolyte supporting matrix in a molten carbonate fuel cell.

One embodiment for producing the present porous tape comprises admixing the coated ceramic particles with an organic binding agent, shaping the mixture into a self-supporting tape, and heating the tape to decompose and vaporize away the binding agent producing the present porous electrolyte tape. The binding agent containing tape is flexible and of uniform or substantially uniform thickness of less than about 30 mils, i.e. it has a thickness which does not differ significantly. The present porous tape has a thickness not significantly different from that of the binding agent-containing tape.

The binding agent is used in an amount sufficient to bind the coated particles together to produce a self-supporting tape from which it can be heat-decomposed and vaporized away leaving no significant residue producing the present porous tape. Generally, the binding agent is used in an amount ranging from about 40% by volume to about 65% by volume, and preferably about 50% by volume, of the total volume of binding agent and carbonate-coated ceramic particles.

The binding agent, i.e. binding agent composition, is a solid at room temperature, melts at an elevated temperature below 400° C., and decomposes below about 400° C. vaporizing away leaving no significant residue thereof. Representative of the present organic binding agents is polyethylene having a melting point of about 137° C., polypropylene with a melting point of about 176° C. and polybutylene with a melting point of about 44° C.

Depending largely on the shaping technique and binding agent composition, an organic plasticizer may be used as part of the binding agent composition to aid in the production of the binding agent-containing tape.

Such plasticizer should be fluid at an elevated temperature and heat decomposable at an elevated temperature below 400° C. vaporizing away leaving no significant residue. Generally, the plasticizer ranges up to about 18% by weight of the binding agent. Representative of the plasticizers is paraffin and dioctyl phthalate.

The binding agent composition should have no significant deleterious effect on the coated particles.

Shaping of the mixture of binding agent and coated particles to produce a binding agent-containing tape can be carried out by a number of techniques. In one shaping embodiment, the mixture of coated particles and binding agent is heat shaped by passing it through hot stainless steel rollers heated to a temperature at which the binding agent is hot and pliable. The thickness of the tape is controlled by setting the distance between rollers.

In another shaping embodiment, the binding agent and coated particles are admixed with an organic liquid medium which has no significant deleterious effect on the coated particles and which is a suspending medium for the binding agent, such as, for example, toluene for polyethylene. The resulting suspension of binding agent and suspended coated particles is tape cast, usually by doctor blading the suspension on a substrate in the thickness desired of the present porous tape, and allowing the coating to dry leaving a flexible tape which can be peeled away from the substrate.

The binding agent-containing tape is heated to decompose and vaporize away the binding agent leaving no significant residue thereof to produce the present porous tape. Preferably, before the carbonate fuel cell is placed in operation, the binding agent-containing tape is placed in the cell and heated therein to decompose and vaporize away the binding agent producing the present porous tape.

Another embodiment of the present invention comprises forming the porous tape by vacuum casting. Preferably, in this technique, the carbonate coated particles are suspended in an organic liquid which has no significant deleterious effect thereon, and the suspension is vacuum cast, i.e. vacuum filtered, as a substantially uniform layer in a thickness desired of the present porous tape, on a flat piece of filter paper on which it is dried. The filter paper is peeled away, leaving the present porous tape. Most preferably, the suspension is vacuum cast onto a face of one of the electrodes to be used in the fuel cell, and in such instance the deposited layer should be coextensive with the face of the electrode. The deposited layer is dried producing a composite of the present porous tape and the electrode which can be placed directly into the fuel cell.

The invention is further illustrated by the following tabulated examples:

In Table I, a number of batches of electrolyte carbonate coated ceramic particles given as Lot No. were prepared.

The procedure used to produce each given Lot No. was the same except as indicated in Table I.

The ceramic particles in Table I were lithium aluminate of the given median particle size, and in Table I, the batch size in grams is that of the $LiAlO_2$ and carbonate, i.e. carbonate-coated $LiAlO_2$ particles.

The carbonate in Table I was comprised of 62 mole % lithium carbonate and 38 mole % potassium carbonate and is based on the total volume of the given $LiAlO_2$ batch size and carbonate.

To produce each given Lot No. of Table I, the carbonate and the lithium aluminate particles were dry ball milled using alumina grinding media and using an equal part by weight of grinding media to the powder being milled. Milling was carried out at room temperature for 3 hours.

The resulting mixture was placed in an alumina crucible and an alumina lid was placed thereon. The mixture was heated in air at ambient pressure to the given temperature at which the carbonate was molten and at which it was maintained for the given time period. Within the given time period, the molten carbonate coated the lithium aluminate particles totally or did not leave any significant portion thereof exposed. At the end of the given time period, the resulting mass was allowed to cool to room temperature to solidify the carbonate.

The solidified mass was lightly comminuted by placing it on an 80 mesh nylon screen and lightly brushing it through the screen with a rubber spatula. The resulting free flowing powder of each Lot No. of Table I was comprised of a plurality of carbonate-coated lithium aluminate particle wherein no significant portion of the lithium aluminate particle was exposed. The coated particles of each Lot No. of Table I did not differ significantly in size from that of the lithium aluminate particles. All of the examples, i.e. Lot Nos. of Table I, illustrate the present invention.

TABLE I

| Lot No. | $LiAlO_2$ Median Particle Size ($\mu$) | Carbonate Coated $LiAlO_2$ Batch Size (grams) | Carbonate (vol. %) | Temperature (°C.) | Time (hrs) |
| --- | --- | --- | --- | --- | --- |
| C1 | 1 | 100 | 10 | 550 | 4 |
| C2 | 0.2 | 100 | 10 | 550 | 4 |
| C3 | 1 | 100 | 10 | 550 | 6 |
| C4 | 2.1 | 213 | 10 | 650 | 4 |
| C5 | 0.2 | 100 | 10 | 650 | 4 |

Each run of Table II illustrates the production of the present porous electrolyte tape and the cell in which it was used as the electrolyte supporting matrix of the tile.

Specifically in Table II, the coated ceramic particles prepared in Table I were used and are identified by Lot No. Also, in Table II, the polyethylene had a melting point of 137° C. and the polybutylene had a melting point of 44° C. The paraffin had a melting point of 50° to 57° C. and was used in the given amount based on the weight of the polybutylene. All of the binding agent compositions in Table II were heat decomposable below 400° C. leaving no significant residue.

The procedure used in each tabulated run of Table II was the same unless otherwise indicated. A conventional hot roll mill with stainless steel rollers preheated to 230° F. was used with the rollers initially set to almost touch, i.e. about 2–4 mils apart. The binding agent composition was particulate in form and was dry ball-milled with the given Lot No. of coated ceramic particles in the given amount to produce a substantially uniform mixture. The mixture was poured on the hot rolls where it began to melt and the rollers were then turned on. The mixture was rolled on the hot rolls several times, cut off with a cutting blade, rolled into a ball and again passed through the hot rolls several times to get a uniform mixture. The rolls were then set a distance apart equivalent to the tape thickness wanted and the front roller was set at a rate faster than the back one so that the tape would adhere to the front roller. The rollers, preheated to 230° F., were then turned on and the tape formed on the front roller. The rollers were then further separated, turned off, the tape cooled to room temperature and peeled off the front roller. In each run, the resulting binding agent-containing tape was flexible, rubbery, and had a thickness which was uniform or which did not differ significantly. In each run, the resulting binding agent-containing tape was about 17" long and about 7" wide.

A portion of each resulting binding agent-containing tape was weighed, heated in air from 25° C. to 400° C. in 13 hours, from 400° C.–650° C. in 6 hours, held at 650° C. for 2 hours and then furnace-cooled to room temperature. Each resulting tape was weighed and the loss in weight caused by the heating, i.e. heat decomposition and vaporization away of the binding agent composition, was equivalent to the theoretical amount of binding agent that had been present in the tape before the heating indicating that no residue or no significant residue of binding agent remained and that the heating had no significant effect on the carbonate-coated particles. Specifically, each resulting tape was comprised of carbonate-coated $LiAlO_2$ particles bound together by the carbonate coating and showed no significant exposure of the $LiAlO_2$ particles. Each resulting tape was porous, self-supporting, and its thickness is given in Table II. Each resulting porous tape was of uniform thickness, or had a thickness which did not differ significantly, and also, its thickness did not differ significantly from that of the binding agent-containing tape.

The pore size distribution of each resulting tape was determined by mercury intrusion porosimetry from which its median pore size and porosity were calculated. The results are given in Table II. The porosity in Table II is % by volume of the total volume of the porous tape.

TABLE II

| Run | Composition | | Thickness (mils) | Porosity (%) | Median Pore Size ($\mu$) | Cell Tests |
| --- | --- | --- | --- | --- | --- | --- |
| 1 | 50 vol. % 50 vol. % | polyethylene Lot C1 | 9 | 49 | 1.1 | #43 |
| 2 | 50 vol. % 50 vol. % | polyethylene Lot C1 | 9 | 49 | 1.1 | #45 |
| 3 | 50 vol. % 50 vol. % | polyethylene { 75 vol. % Lot C1 25 vol. % Lot C2 | 19 | 44 | 0.55 | #49 #55 |
| 4 | 50 vol. % 50 vol. % | polybutylene { 75 vol. % Lot C1 25 vol. % Lot C2 | 19 | 44 | 0.53 | #52 #54 #56 |

TABLE II-continued

| Run | Composition | | Thickness (mils) | Porosity (%) | Median Pore Size (μ) | Cell Tests |
|---|---|---|---|---|---|---|
| 5 | 50 vol. % wt. % | polybutylene & 12 paraffin | | | | |
| | 50 vol. % | { 75 vol. % Lot C4 25 vol. % Lot C5 | 15 | 51 | 0.87 | not cell tested yet |
| 6 | 50 vol. % | polyethylene | | | | |
| | 50 vol. % | { 75 vol. % Lot C3 25 vol. % Lot C5 | 23 | 47 | 0.87 | #62 #63 |
| 7 | 50 vol. % wt. % | polybutylene & 12 paraffin | | | | |
| | 50 vol. % | { 75 vol. % Lot C4 25 vol. % Lot C5 | 19 | — | — | #53 #57 |
| 8 | 50 vol. % wt. % | polybutylene & 18 paraffin | | | | |
| | 50 vol. % | { 75 vol. % Lot C4 25 vol. % Lot C5 | 20 | 45 | 0.94 | #58 #59 #60 |

Also, in each tabulated run of Table II, before start up of the cell, a square of the binding agent-containing tape, 4¾"×4¾", was placed in each cell. Enough carbonate composed of 62 mole % lithium carbonate and 38 mole % potassium carbonate was then added to fill the porosity of the porous tape in each cell. Each cell was then heated from 25° C. to 400° C. at a rate of 15.4° C./hr, from 400° C. to 500° C. at a rate of 30° C./hr and from 500° C. to 650° C. at a rate of 90° C./hr. From previous tests, it had been determined that at 400° C. all of the binding agent had decomposed and vaporized away producing the present porous tape. At about 496° C., the carbonate began to melt and at about 510° C.–520° C. the molten carbonate had filled the porosity of each tape. At 650° C., each cell was placed on load for testing.

The accompanying FIGURE shows the performance of the cells of Table II along with a number of other molten carbonate fuel cells. Specifically, each point on the FIGURE illustrates the performance of a molten carbonate fuel cell. The numbered points on the FIGURE correspond to the cell numbers of Table II. The points in the FIGURE without a number, i.e. state of the art cells, were cells which did not differ significantly from the numbered cells except that they did not contain the present porous tape as an electrolyte supporting matrix.

The performance of all of the cells of the FIGURE were tested in substantially the same manner. Specifically, each cell had a medium BTU fuel wherein the anode gas was comprised of 48% by volume $H_2$, 32% by volume $CO_2$ and 20% by volume $H_2O$, and the cathode gas was comprised of 20% by volume $CO_2$, 12% by volume $O_2$ and 20% by volume $H_2O$ balance $N_2$. The fuel and oxidant had a flow rate such that at load it would use 75% of the $H_2$ and 50% of the $O_2$, respectively.

The FIGURE shows individual cell peak performance at 650° C. at a load of 160 ma/cm². The FIGURE shows that for those cells that did not utilize the present porous tape, there is widely ranging cell performance most of which was below the goal for the cell of 0.725 volt. In contrast, for the numbered cells of the FIGURE, i.e. those containing the present porous tape, the performance was much more consistent and in all cases equivalent to or greater than the goal of 0.725 volts.

What is claimed is:

1. A porous electrolyte tape structure for supporting electrolyte in a molten carbonate fuel cell consisting essentially of a plurality of electrolyte carbonate-coated ceramic particles having no significant portion of the ceramic particles exposed, said ceramic particles not being significantly deleteriously effected by said molten carbonate fuel cell, said ceramic particles ranging in diameter from about 0.1 micron to about 5 microns, said electrolyte carbonate coating consisting essentially of a carbonate useful as an electrolyte in a molten carbonate fuel cell and ranging from about 5% by volume to about 30% by volume of said coated ceramic particle, said coated ceramic particle not differing significantly in diameter from said ceramic particle, said tape structure having a thickness substantially greater than the diameter of the ceramic particles and said thickness encompassing a plurality of said particles, said porous tape having a substantially uniform thickness of less than 30 mils and a porosity ranging from about 30% by volume to about 65% by volume of the total volume of said tape.

2. A porous electrolyte tape for supporting electrolyte in a molten carbonate fuel cell consisting essentially of a plurality of electrolyte carbonate-coated ceramic particles and having no significant portion of the ceramic particle exposed, said ceramic particles being selected from the group consisting of lithium aluminate, strontium titanate and mixtures thereof and ranging in size from about 0.2 micron to about 2 microns, said electrolyte carbonate coating consisting essentially of a carbonate useful as an electrolyte in a molten carbonate fuel cell and ranging from about 5% by volume to about 30% by volume of said coated ceramic particles, said coated ceramic particle not differing significantly in size from said ceramic particle, said porous tape having a substantially uniform thickness of less than 30 mils and a porosity ranging from about 30% by volume to about 65% by volume of the total volume of said tape.

3. A composite useful in a molten carbonate fuel cell comprising of an electrode carrying a porous electrolyte tape on one face thereof, said porous tape being coextensive with said face of said electrode, said porous tape having a substantially uniform thickness of less than 30 mils and a porosity ranging from about 30% by volume to about 65% by volume of the total volume of said tape, said porous tape consisting essentially of electrolyte carbonate-coated ceramic particles wherein no significant portion of said ceramic particle is exposed, said electrolyte carbonate coating consisting essentially of a carbonate useful as an electrolyte in a molten carbonate fuel cell, said ceramic particles ranging in size from about 0.1 micron to about 5 microns, said ceramic particles not being significantly deleteriously effected by said molten carbonate fuel cell, said electrode being useful as an electrode in a molten carbonate fuel cell.

4. The composite according to claim 3 wherein said ceramic particles are selected from the group consisting of lithium aluminate, strontium titanate and mixtures thereof.

5. A tape for use in a molten carbonate fuel cell consisting essentially of a plurality of electrolyte carbonate-coated ceramic particles in combination with an organic binding agent decomposable below 400° C. to leave a porous tape structure for supporting electrolyte, said amount of binding agent ranging from about 40% to about 65% of the total volume of binding agent and carbonate-coated ceramic particles, said ceramic particles having no significant portion thereof exposed and not being significantly deleteriously effected by said molten carbonate fuel cell, said ceramic particles ranging in diameter from about 0.1 micron to about 5 microns, said electrolyte carbonate being selected from the group consisting of lithium carbonate, sodium carbonate, potassium carbonate, mixtures thereof, and mixtures thereof with strontium carbonate, said electrolyte carbonate ranging from about 5% by volume to about 30% by volume of said coated ceramic particles, said coated ceramic particle not differing significantly in diameter from said ceramic particle, said tape structure having a thickness substantially greater than the diameter of the ceramic particles and said thickness encompassing a plurality of said particles, said porous tape having a substantially uniform thickness of less than 30 mils and a porosity ranging from about 30% by volume to about 65% by volume of the total volume of said tape.

6. A composite useful in a molten carbonate fuel cell comprising an electrode carrying a porous electrolyte tape on one face thereof, said porous tape being coextensive with said face of said electrode, said porous tape having a substantially uniform thickness of less than 760 microns and a porosity ranging from about 30% by volume to about 65% by volume of the total volume of said tape, said porous tape consisting essentially of electrolyte carbonate coated-ceramic particles wherein no significant portion of said ceramic particle is exposed, said electrolyte carbonate being selected from the group consisting of lithium carbonate, sodium carbonate, potassium carbonate, mixtures thereof, and mixtures thereof with strontium carbonate, said ceramic particles ranging in diameter from about 0.1 microns to about 5 microns, said ceramic particles not being significantly deleteriously effected by said molten carbonate fuel cell, said tape structure having a thickness substantially greater than the diameter of the ceramic particles and said thickness encompassing a plurality of said particles, said electrode being useful as an electrode in a molten carbonate fuel cell.

* * * * *